United States Patent [19]

Asp

[11] Patent Number: 4,827,103

[45] Date of Patent: May 2, 1989

[54] METHOD AND DEVICE FOR ADJUSTING THE HEAT FLOW AT HEATING SEATS

[75] Inventor: Torbjörn Asp, Charlottenberg, Sweden

[73] Assignee: Tocksfors Verkstads AB, Tocksfors, Sweden

[21] Appl. No.: 145,876

[22] Filed: Jan. 20, 1988

[51] Int. Cl.⁴ .............................................. H05B 1/02
[52] U.S. Cl. ................................... 219/217; 219/494; 219/528
[58] Field of Search ............... 219/202, 217, 516, 494, 219/497, 528, 529, 549

[56] References Cited

U.S. PATENT DOCUMENTS

| | | | |
|---|---|---|---|
| 2,698,893 | 1/1955 | Ballard | 219/494 |
| 4,245,149 | 1/1981 | Fairlie | 219/494 |
| 4,274,475 | 6/1981 | Rall | 219/497 |
| 4,546,238 | 10/1985 | Åhs | 219/497 |
| 4,700,046 | 10/1987 | Fristedt | 219/497 |

FOREIGN PATENT DOCUMENTS 54-28438  3/1979  Japan .................. 219/494

Primary Examiner—Teresa J. Walberg
Attorney, Agent, or Firm—Michael, Best & Friedrich

[57] ABSTRACT

A method and a device for adjusting the heat flow at heating seats having heat generators (3) in the form of for example heating conductors placed in coils. The direction of the heat flow between the sitting surface of the seat and the heat generator (3) is sensed and power is supplied to the heat generator (3) when the direction of the heat flow is from the sitting surface into the chair.

15 Claims, 2 Drawing Sheets

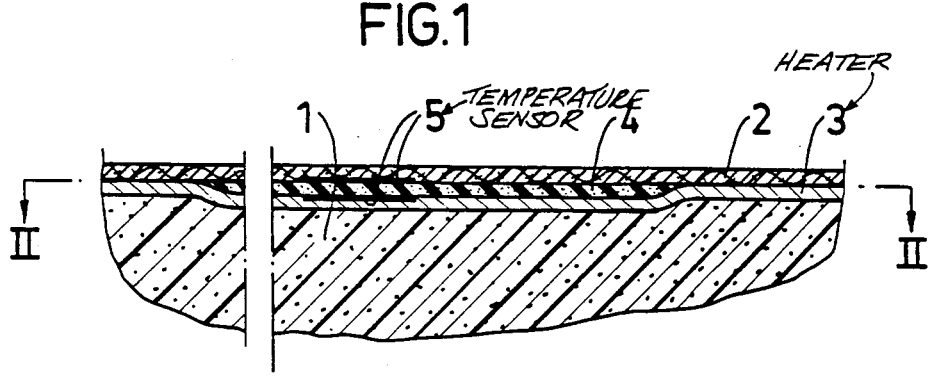
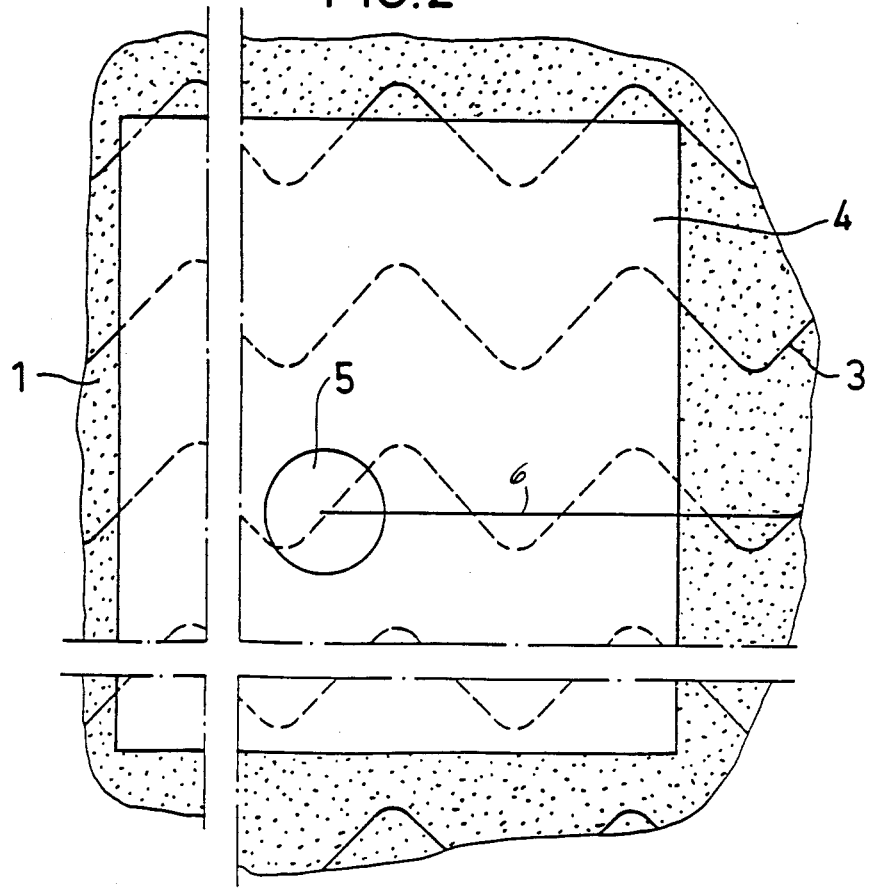

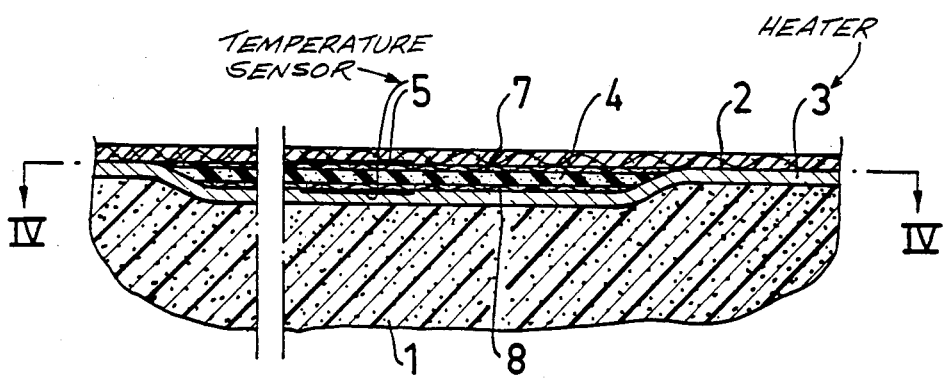
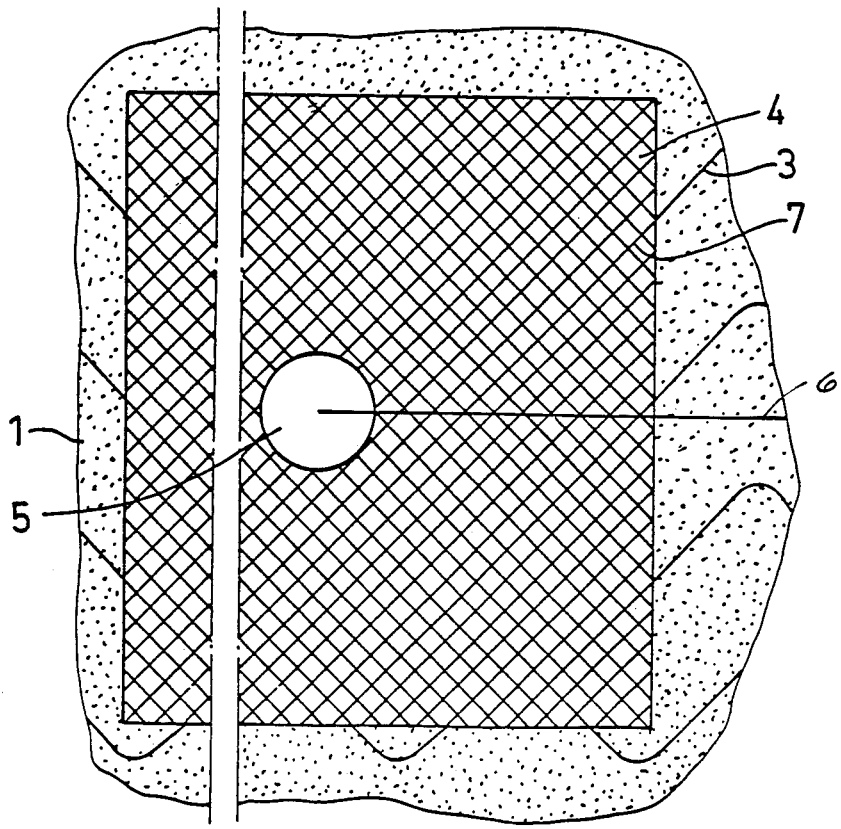

METHOD AND DEVICE FOR ADJUSTING THE HEAT FLOW AT HEATING SEATS

This invention relates to a method as well as a device for adjusting the heat flow at heating seats having heat generators in the form of for example heating conductors placed in coils in the seat.

Today heated chairs or seats are found as natural equipment in vehicles in order to offer driver and passengers as much comfort as possible.

So far the heat of the chair or seat has been adjusted by the aid of a thermostat connecting or cutting out the current for heating the chair depending on established and sensed maximum and minimum temperatures. This adjustment of the heat of the seat, which is quite dependent on temperature, must be considered as relatively course and the user can perceive the seat as either too cool or too warm depending on the fact when the current to the heat generator of the seat is connected or cut out and on the existing outer temperature conditions.

In order to increase comfort and to eliminate the feeling that a heated chair or seat is too cold and too warm the invention has been given the characteristic features defined in the claims. The body senses heat or cold depending on whether heat energy is supplied to the body or emitted from it and comfort of long duration is achieved if only a slight flow of heat leaves the body.

The invention will be described in greater detail in the form of examples with reference to the drawing, wherein FIG. 1 shows a schematic part section of a chair or seat with the invention mounted therein and FIG. 2 shows the corresponding section as seen in the direction of the section II—II in FIG. 2. FIG. 3 shows a part section of a seat with another embodiment of the invention mounted therein and FIG. 4 shows the corresponding part section as seen in the direction IV—IV of the section in FIG. 3.

Thus, FIG. 1 shows schematically a part of a chair or seat—for example a car seat—the body of which is designated by 1. The cover or upholstery of the chair is designated by 2. A heat generator is placed in conventional manner between the cover and the body, in the case shown in the form of zig-zag-shaped heating conductors 3 drawn back and forth over the seat. In FIGS. 2 and 4 these heating conductors 3 are marked by only one full line. Between the cover 2 and the heating conductors 3 a layer 4 with limited surface extension is arranged. The thickness of the layer 4 is not more than about 1 mm. A temperature sensor 5 is arranged on each side of the layer 4, i.e. between this and the cover 2 and the heating conductors 3, respectively. The temperature sensors 5 are of some type known per se and are no part of the invention. The respective temperature sensor 5 is connected via a line 6 (not shown in FIGS. 1 and 3) to a means comparing the signals of the sensors, which is not shown and, like the temperature sensor, is publicly known technique and, thus, is no part per se of the invention.

The signals of the interior temperature sensor 5 turned to the heating conductors 3 indicate a value of the temperature of the inside of the layer 4. The signals of the temperature sensor placed between the layer 4 and the cover 2 indicates a values of the temperature of the outside of the layer 4. The comparing means will then "sense" whether the value of the upper temperature sensor is greater than that of the lower or vice versa. In the case when the value of the upper temperature sensor 5 is greater than that of the lower this indicates that a heat flow comes from the seat surface into the chair. The comparing means is thus adapted to connect the current to the heating conductors 3 and these will heat the chair. If the lower sensor 5 indicates a higher value than the upper this indicates that a heat flow goes from within the chair and outwards. In this case the comparing means will cut out the current to the heating conductors 3. The output of the comparing means is connected to a relay or a semiconductor switch controlling the power supply of the heating conductors.

Thus, the function of the invention is such that power is supplied to the heating conductors as soon as the comparing means will sense an inward heat flow into the chair. The power supply of the heating conductors is interrupted as soon as their heat has balanced out the flow, i.e. the cooling of a person in the chair has ceased. This is the principle of the function and in reality a small hysteresis effect is arranged in the comparing means in order to prevent instability close to the point of reversal. In practical use the desired control will not be so set that the heat flow becomes zero but so that there is a flow of about 5–10 mW/cm$^2$ from the body of the person sitting in the chair. Such a flow will give the best comfort of long duration.

FIGS. 3 and 4 show a somewhat different embodiment of the invention. On each side of the layer 4 a first layer 7 and a second layer 8 are arranged. A temperature sensor 5 is connected to these layers 7 and 8, respectively. These thin layers 7 and 8 should consist of a material having a good thermal conductivity and may have the form of for example a metal net, as shown in FIG. 4, a metal foil or the like. It is the object of these thin layers 7 and 8 to balance variations in temperature across the surface of the first layer 4 due to irregularities in the heat flow caused by for example the location of the heat conductors 3, the structure of the cover 2, external circumstances etc.

Of course the need of the thin layers 7 and 8 is dependent on the material of the heat-conductive layer 4 and the type and form of the heat generator 3. The thermal conductivity of the layer 4 should be of the same order but not necessarily the same as the rest of the chair. If the heat conductivity of the layer 4 is too great the temperature difference to be measured by the temperature sensor will be small which requires more exact and expensive comparing means. On the other hand, if the heat conductivity is essentially inferior to the rest of the chair said difference will be satisfactory for the measurement but the sitting surface can be felt to be cold in the part where the device is mounted.

In FIGS. 1 and 3 the device has been shown with narrowing edge areas in order not to act on the sitting surface and it is indicated in FIGS. 2 and 4 that the device has a square configuration. Depending on the thickness of the layers 4, 7 and 8 it is possible to let the edges of the layers end abruptly and not narrowing and the device can be given for example a circular form as seen from above (see FIGS. 2 and 4). A layer of for example foam plastic can also be used between the cover 2 and the heat generator 3 further covering the device.

As examples of materials of the layer 4 a felt material, a cotton fabric, foam plastic etc. can be mentioned. For the sake of comfort the material should be elastic.

What is claimed is:

1. A method for adjusting heat floiw in a seat having a sitting surface and heat generator, characterized by sensing the direction of theheat flow between the sitting surface, of the seat and the heat generator and automatically supplying power to the heat generator when the heat flow is in a direction from the sitting surface into the seat.

2. The method of claim 1, characterized by discontinuing said step of supplying power to the heat generator whenthe heat flow in the direction from the sitting surface into the seat is 5-10 mW/cm$^2$.

3. A device for adjusting the heat flow in a seat having a sitting surface and a heat generator, said device comprising means for sensing the direction of heat flow between a sitting surface of a seat and a heat generator and for supplying power to the heat generator when the direction of the heat flow is from the sitting surface into the seat, characterized in that a first layer (4) of a heat-conductive material is arranged between the heat generator (3) and the sitting surface of the seat and that a temperature sensor (5) is arranged in connection with each side of the layer (4) one side temperature sensor facing the sitting surface and a second said temperature sensor facing the heat generator (3), said temperature sensors (5) being connected to a means comparing signals of the sensors and arranged to connect or cut out the current to the heat generator (3).

4. The device of claim 3, characterized in that a second layer (7) of a heat-conductive material having a coefficient of thermal conductivity different from that of the first layer (4) is arranged at the first layer (4) between the first layer and the sitting surface and that one temperature sensor (5) is arranged in connection with the second layer (7).

5. The device of claim 4, characterized in that the first layer (4) has a thermal conductivity substantially the same as that of the rest of the seat.

6. The device of claim 4, characterized in that a third layer (8) of a heat conductive material having a coefficient of thermal conductivity different from that of the first layer (4) is arranged at the first layer (4) between the first layer and the heat generator (3) and that the second temperature sensor (5) is arranged in connection with the third layer (8).

7. The device of claim 6, characterized in that the second (7) and third (8) layers consist of a material having a high coefficient of thermal conductivity.

8. The device of claim 6, characterized in that the second (7) and third (8) layers have the form of a net.

9. The device of claim 4, characterized in that the second layer consists of a material having a high coefficient of thermal conductivity.

10. The device of claim 4, characterized in that the second layer (7) has the form of a net.

11. The device of claim 3, characterized in that a third layer (8) of a heat conductive material having a coefficient of thermal conductivity different from that of the first layer (4) is arranged at the first layer (4) between the first layer and the heat generator (3) and that the second temperature sensor (5) is arranged in connection with the third layer (8).

12. The device of claim 11, characterized in that the first layer (4) has thermal conductivity substantially the same as that of the rest of the seat.

13. The device of claim 11, characterized in that the third layer (8) consists of a material having a high coefficient of thermal conductivity.

14. The device of claim 11, characterized in that the third layer (8) has the form of a net.

15. The device of claim 3, characterized in that the first layer (4) has a thermal conductivity substantially the same as that of the rest of the seat.

* * * * *

UNITED STATES PATENT AND TRADEMARK OFFICE
CERTIFICATE OF CORRECTION

PATENT NO. : 4,827,103
DATED : May 2, 1989
INVENTOR(S) : Torbjorn Asp

It is certified that error appears in the above-identified patent and that said Letters Patent is hereby corrected as shown below:

Column 1, line 65, the word "values" should read --value--.

Column 2, line 16, the word "of" should read --to--.

Column 3, line 1, the word "floiw" should read --flow--.

Column 3, line 2, insert after the word "and" the word --a--.

Column 3, line 3, delete the word "theheat" and insert the words --the heat--.

Column 3, line 4, after the word "surface" delete the --,--.

Column 3, line 10, the word "whenthe" should read --when the--.

Column 3, line 22, the word "side" should read --said--.

Column 4, line 17, after the word "layer" insert the reference --(7)--.

Signed and Sealed this

Seventeenth Day of July, 1990

*Attest:*

HARRY F. MANBECK, JR.

*Attesting Officer*     *Commissioner of Patents and Trademarks*